US010730535B2

(12) United States Patent
Hackett

(10) Patent No.: US 10,730,535 B2
(45) Date of Patent: Aug. 4, 2020

(54) EMERGENCY ARREST DEVICE FOR ZIP LINE

(71) Applicant: Donald Andrew Hackett, Hendersonville, TN (US)

(72) Inventor: Donald Andrew Hackett, Hendersonville, TN (US)

( * ) Notice: Subject to any disclaimer, the term of this patent is extended or adjusted under 35 U.S.C. 154(b) by 0 days.

(21) Appl. No.: 16/263,599

(22) Filed: Jan. 31, 2019

(65) Prior Publication Data
US 2019/0232984 A1 Aug. 1, 2019

Related U.S. Application Data

(60) Provisional application No. 62/625,332, filed on Feb. 1, 2018.

(51) Int. Cl.
*B61H 9/02* (2006.01)
*F16D 63/00* (2006.01)

(52) U.S. Cl.
CPC ............. *B61H 9/02* (2013.01); *F16D 63/008* (2013.01)

(58) Field of Classification Search
CPC ...................................... B61H 9/02; F16D 63/008; A62B 1/14; A62B 35/04; A63G 21/22; E06C 7/186; B60T 11/046; B66D 5/16
USPC .......................................................... 188/68
See application file for complete search history.

(56) References Cited

U.S. PATENT DOCUMENTS

| | | | | |
|---|---|---|---|---|
| 1,072,814 A | * | 9/1913 | Booth | A62B 1/14 188/65.3 |
| 1,935,711 A | * | 11/1933 | Hecox | A62B 1/14 182/11 |
| 4,106,753 A | * | 8/1978 | Cavalieri | B66B 5/24 182/112 |
| 4,474,262 A | * | 10/1984 | Himmelrich | A62B 1/14 182/5 |
| 4,657,110 A | * | 4/1987 | Wolner | A62B 35/04 182/192 |
| 5,265,696 A | * | 11/1993 | Casebolt | A62B 1/14 182/192 |
| 5,638,919 A | * | 6/1997 | Pejout | A62B 1/14 182/192 |
| 5,931,100 A | | 8/1999 | Sutton et al. | |
| 7,966,941 B1 | | 6/2011 | Brannan | |
| 8,997,928 B1 | * | 4/2015 | Ellis | E06C 7/186 182/36 |
| 9,004,235 B2 | | 4/2015 | Headings | |
| 9,021,962 B2 | | 5/2015 | Hackett | |

(Continued)

*Primary Examiner* — Mark T Le
(74) *Attorney, Agent, or Firm* — United IP Counselors, LLC

(57) ABSTRACT

An emergency arrest device for a zip line is disclosed. The emergency arrest device is designed to tension and control a slide-and-grip knot, such as a Prusik knot, that is tied on the zip line. The device includes a mirror-image set of sidewalls, a front endwall connected between the pair of sidewalls at a front end of the device, and a rear endwall connected at a rear end of the device. The front and rear endwalls have openings sized to permit passage of the zip line therethrough. A tail fixation assembly including a clamp is mounted in the rear of the device. A knot-body control assembly is mounted in the front of the device. The knot-body control assembly includes arms that are resiliently biased to push the body of the slide-and-grip knot rearwardly when the device is impacted.

16 Claims, 6 Drawing Sheets

(56) References Cited

U.S. PATENT DOCUMENTS

| | | |
|---|---|---|
| 2006/0027134 A1 | 2/2006 | Steele et al. |
| 2007/0039788 A1 | 2/2007 | Fulton |
| 2007/0215569 A1 | 9/2007 | Chepurny et al. |
| 2009/0255436 A1 | 10/2009 | Buckman |
| 2009/0266267 A1 | 10/2009 | Moss |
| 2010/0051381 A1* | 3/2010 | Wydner .................. A62B 1/14 182/5 |
| 2010/0243374 A1 | 9/2010 | Boren et al. |
| 2011/0162917 A1 | 7/2011 | Steele et al. |
| 2012/0118666 A1* | 5/2012 | Raoul Bingham .... A63B 29/02 182/5 |
| 2012/0145498 A1 | 6/2012 | Liston et al. |
| 2012/0160122 A1 | 6/2012 | Lerner et al. |
| 2014/0262609 A1* | 9/2014 | Antonio .................. A62B 1/20 182/5 |
| 2014/0326161 A1 | 11/2014 | Halliday et al. |
| 2018/0214782 A1 | 8/2018 | Hackett |

* cited by examiner

EMERGENCY ARREST DEVICE FOR ZIP LINE

CROSS-REFERENCE TO RELATED APPLICATIONS

This application claims priority to U.S. Provisional Patent Application No. 62/625,332, filed Feb. 1, 2018. The contents of that application are incorporated by reference in their entirety.

BACKGROUND OF THE INVENTION

1. Field of the Invention

The invention relates to emergency braking and arrest devices and methods for zip lining.

2. Description of Related Art

A zip line is a tensioned cable, usually made of aluminum or steel wire rope, that is strung between two objects, usually several meters above ground level. Zip lines are typically used for sightseeing: a trolley is placed on the zip line, and a rider is attached to the trolley with a harness. The rider traverses the zip line using the trolley. The zip line is usually at least slightly inclined, so that the trolley moves under gravity from one end of the zip line to the other.

The speed of a rider along a zip line depends on several factors, including the incline of the zip line, the weight of the rider, friction between the trolley and the line, and wind speed and direction. In order to reach the other end of the line, a rider must accumulate enough speed and momentum to reach the other side. If the trolley is too slow (e.g., because the zip line is not inclined steeply enough) friction and other factors may cause the trolley to stop moving in the middle of the line, leaving the rider stranded and requiring course personnel to go out onto the line and haul the trolley in—a difficult process made more difficult and dangerous by the height.

While lack of sufficient speed is a problem, too much speed is also a problem. Simply put, zip line riders need some mechanism to stop. In some cases, zip liners are simply issued thick leather gloves, and are expected to slow down by grabbing or brushing against the zip line above them. Dislocated shoulders can result from this maneuver.

In recent years, there have been some attempts to provide mechanical braking systems for zip line trolleys. One general type of system, exemplified by U.S. Patent Application Publication No. 2011/0162917 to Steele et al., requires extensive modifications to the typical course and equipment, and has not been widely used. Another more recent patent, U.S. Pat. No. 9,004,235 to Randy Headings, substitutes a mechanical brake for a gloved hand. More specifically, in this patent, a housing is connected to the trolley. The housing has a downwardly-facing brake pad that faces the zip line. When a rider taps or holds the exterior of the housing, the brake pad rubs against the zip line and slows the trolley. This solution may be safer than the gloved-hand approach, but it is no more efficient and risks slowing the rider too much.

U.S. Pat. No. 9,021,962, the work of the present inventor, discloses an external brake that can be set near the end of a zip line. When a trolley contacts the brake, sets of wheels guided by angled guide slots within the brake apply gradually increasing, rolling pressure to the zip line to slow and arrest the trolley. In some embodiments, the brake may also physically capture the trolley so that it can be hauled in if necessary. Devices in accordance with this patent have found commercial success on zip line courses around the world.

The device of U.S. Pat. No. 9,021,962 is typically used as a primary braking system—the main system used to slow and stop a rider on a zip line. Most courses have a backup or emergency braking system as well, and some jurisdictions have begun to require backup or emergency braking systems.

For some courses, the backup breaking system is a simple Prusik knot tied directly on the zip line. A Prusik knot is the most common of a class of so-called "slide and grip knots" that use friction to stay in place on a larger line or rope. Used on a zip line, it acts as a stopper, stopping a trolley on impact.

To make a Prusik knot, a loop of rope is wrapped around the zip line (or another rope) several times and passed through itself each time. When tension is applied to the tail of the Prusik knot, the knot cinches on the zip line and will not move; when tension is released from the tail of the Prusik knot, the knot can slide along the line.

Prusik knots can be used, for example, in rock climbing, to support a climber in either ascent or descent. However, unless there is tension on the tail of a Prusik knot, it will slide and not cinch. This can be a problem when the Prusik knot is used mostly horizontally on a zip line: some courses do not have an easy way to ensure that the tail of the Prusik knot remains tensioned.

BRIEF SUMMARY

One aspect of the invention relates to an emergency arrest device for a zip line. The emergency arrest device is designed to tension and control a slide-and-grip knot, such as a Prusik knot, that is tied on the zip line, in order to stop an impacting object, usually either a trolley or a primary brake, effectively. The device includes a mirror-image set of sidewalls, a front endwall connected between the pair of sidewalls at a front end of the device, and a rear endwall connected at a rear end of the device. The front and rear endwalls have openings sized to permit passage of the zip line therethrough. A tail fixation assembly including a clamp is mounted in the rear of the device. A knot-body control assembly is mounted in the front of the device. The knot-body control assembly includes arms that are resiliently biased to push the body of the slide-and-grip knot rearwardly when the device is impacted.

Other aspects, features, and advantages of the invention will be set forth in the following description.

BRIEF DESCRIPTION OF THE DRAWING FIGURES

The invention will be described with respect to the following drawing figures, in which like numerals represent like elements throughout the figures, and in which.

DETAILED DESCRIPTION

Figure 1:
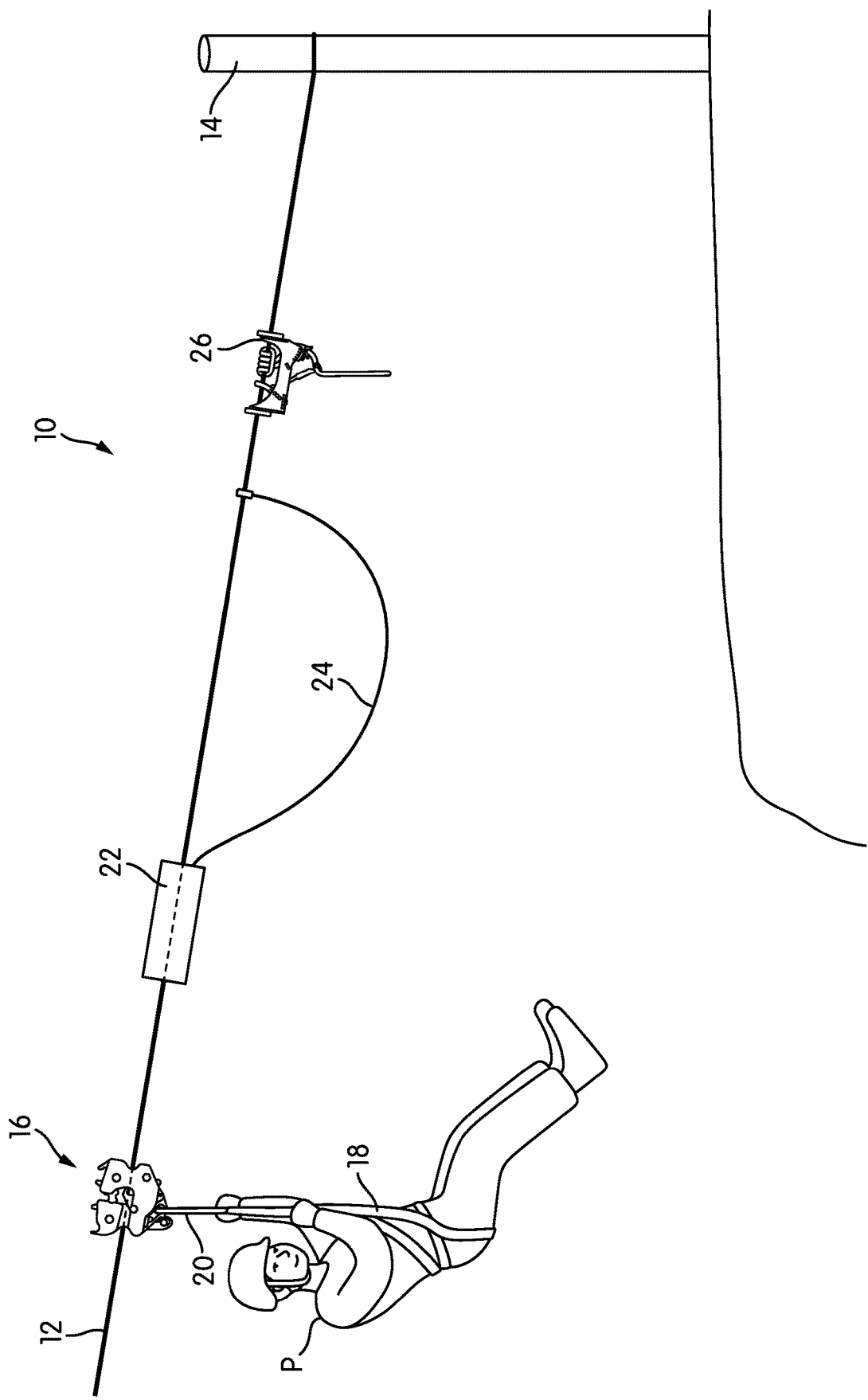
FIG. 1 is an illustration of zip line system according to one embodiment of the present invention, showing primary and emergency braking devices.

FIG. 1 is an illustration of a zip line system, generally indicated at 10, according to one embodiment of the invention. A zip line 12 is suspended between two supports 14, only one of which is shown in the view of FIG. 1. The zip line 12 may be, for example, tensioned steel wire-rope. A trolley 16 is mounted on the zip line and carries a passenger P, who wears a harness 18 that is connected to the trolley 16 by a tether 20. Standard carabiners and other such hardware and equipment may be used to make that connection. The trolley 16 may be of any type, although the trolley 16 illustrated in FIG. 1 is of the type disclosed in U.S. Patent Application Publication No. 2018/0214782, the contents of which are incorporated by reference in their entirety.

As shown, the zip line 12 is inclined, so the trolley 16 and its passenger P are biased by gravity to move toward the support 14 and the end of the zip line 12. A primary brake 22 is deployed on the zip line 12. The primary brake 22 may vary in construction from embodiment to embodiment. In some cases, a primary brake 22 may not be used; instead, passengers P may be issued leather gloves and taught to put their gloved hand atop the zip line 12 for manual braking. However, for purposes of this description, the primary brake 22 can be considered to be one of the brakes disclosed in U.S. Pat. No. 9,021,962. The primary brake 22 is disposed at the end of a line 24 that allows it to be more easily hauled in toward the support, if needed.

FIG. 1 illustrates an emergency or backup braking device 26. (In this description, the words "backup" and "emergency" will be used interchangeably, not to refer to any specific misfortune or calamity, but to imply that while the device 26 can be used alone to stop a trolley 16 on a zip line 12, in practice, it will often be used in combination with another braking device or system.) Devices of this type may also be referred to as emergency arrest devices (EADs). Moreover, while the device 26 may be described as an emergency or backup braking device for the sake of simplicity, the device itself is not a brake per se; instead, it is a control and tensioning mechanism for a slide-and-grip knot, such as a Prusik knot. Although the following description focuses on the Prusik knot as the slide-and-grip knot, the knot that is used may be another type of slide-and-grip knot.

Figure 2:
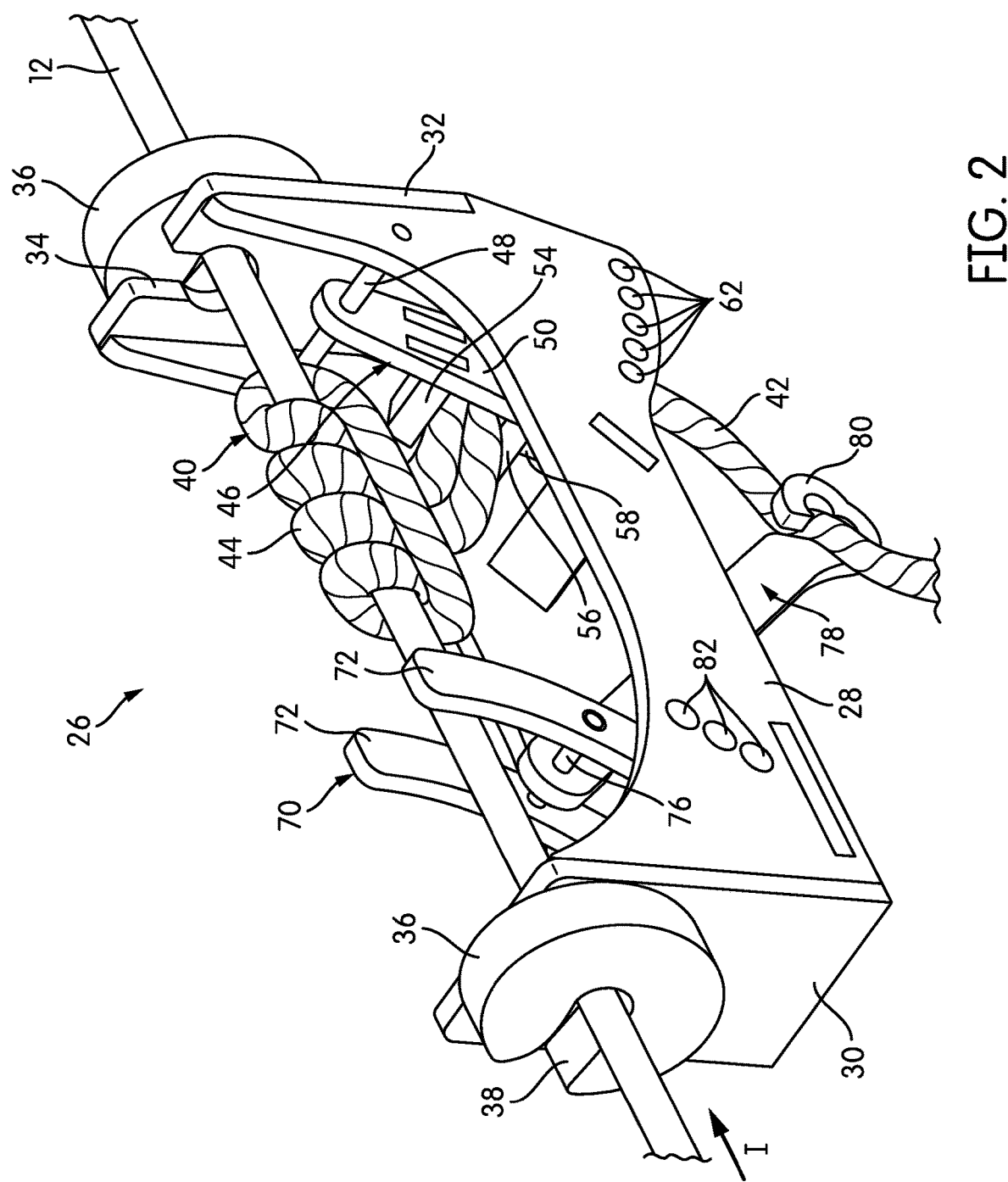
FIG. 2 is a perspective view of the emergency braking device of FIG. 1.
Figure 3:
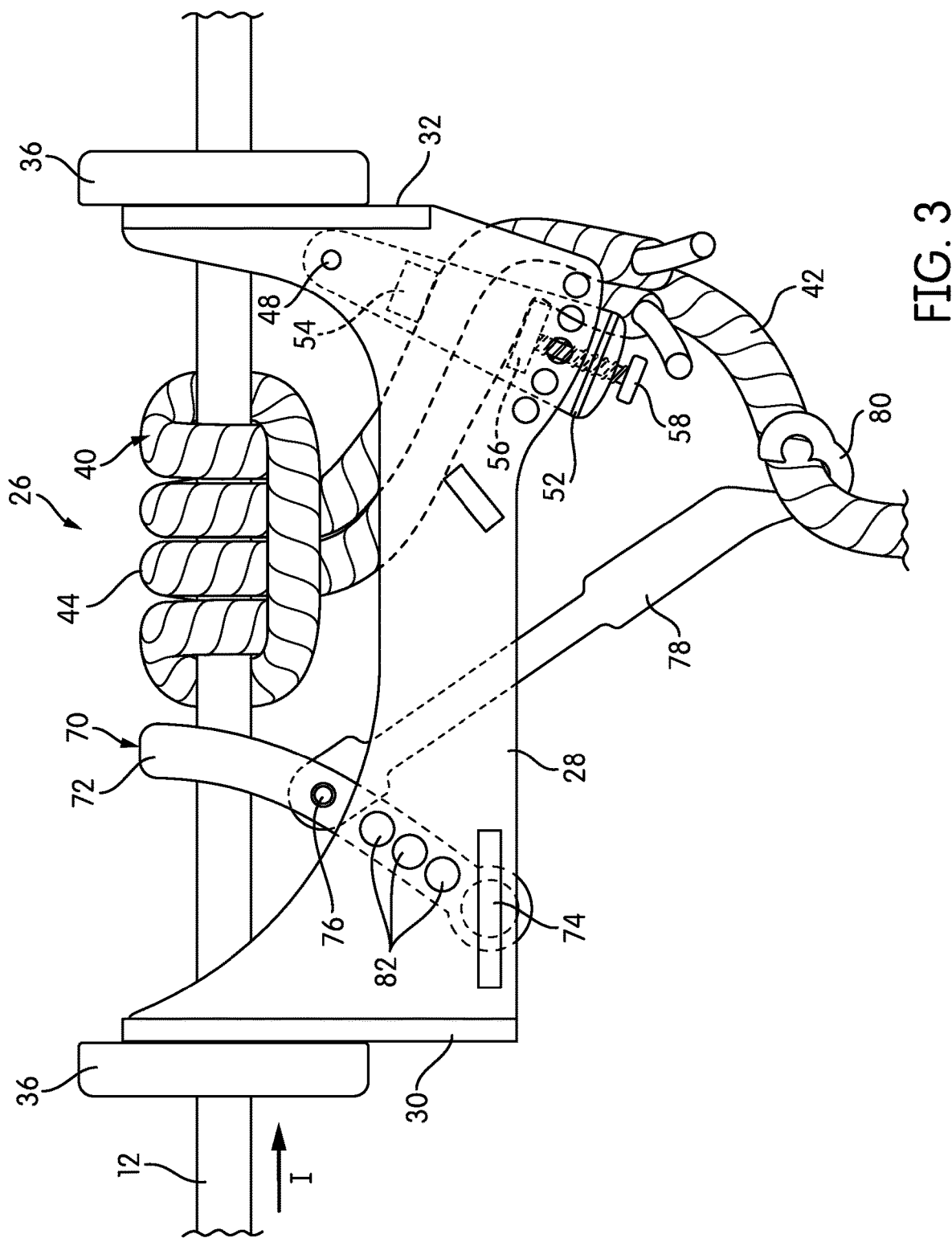
FIG. 3 is a side elevational view of the emergency braking device of FIG. 1.

FIG. 2 is a perspective view of the backup braking device 26, shown with a portion of the zip line 12, and FIG. 3 is a side elevational view of the device 26. The device 26 is a four-sided frame with two long sidewalls 28 and two endwalls 30, 32. In the device 26 of FIGS. 1-3, the two long sidewalls 28 are mirror images of one another; the endwalls 30, 32 differ somewhat in construction, as will be described below in more detail. The device 26 has no bottom; the walls 28, 30, 32 are joined at their corners and at certain points along the length of the device 26.

Each endwall 30, 32 has a keyhole-type slot 34 that opens at a top edge of the endwall 30, 32 and extends downwardly, providing enough space to accommodate the zip line 12. (Only the slot 34 in the forward endwall 32 is visible in the view of FIG. 2.) As shown, the zip line 12 is seated in both slots 34, and thus extends through the length of the device 26. In order to retain the zip line 12 in the slots 34, a C-shaped bumper 36 is placed at each end of the device 26. Each bumper 36 has a slot 38, and the slots 38 are oriented so that they open in a different direction than the slots 34 on the endwalls 30, 32 of the device 26. The bumpers 36 are secured to the endwalls 30, 32.

The shape of the slots 34 in the endwalls 30, 32 is not critical, and may vary from embodiment to embodiment, so long as it can accommodate the size of the zip line 12. In the embodiment of FIGS. 2-3, the slots 34 are unlined, although they may be lined with rubber, plastic, or another such material. In general, the device 26 and its components would be made of a metal, such as steel or aluminum. Ideally, the material of which the device 26 is made is such that movement along the zip line 12 cannot readily wear through it. If the device 26 is made of steel or another material that could corrode or react on exposure to the elements or to the zip line 12, it may be painted, anodized, powder coated, or otherwise treated to protect surfaces and increase its exposure resistance.

As shown, the sidewalls 28 of the device 26 are not straight-sided. Instead, each sidewall 28 is cut down in an elongated, asymmetrical U-shape to a minimum height that is about half of the height of the device 26 at its ends. This permits access to the interior of the device 26 and the zip line 16.

Within the device 26 is a Prusik knot 40, tied around the zip line 12. To make the Prusik knot 40 of FIG. 2, the rope has been passed through itself twice, resulting in four coils, although Prusik knots with many more coils may be used. As those of skill in the art will realize, the more coils in the Prusik knot 40, the more the knot 40 can exert frictional force on the zip line 12 and prevent sliding. The device 26 is long enough to accommodate Prusik knots 40 with more coils. Depending on the embodiment, the Prusik knot 40 may either be tied on the zip line 12 prior to installation of the device 26 or tied on the zip line 12 after installation of the device 26, although it may be more convenient to tie the Prusik knot 40 before installing the device 26. Once the Prusik knot 40 is tied, if it is intended for permanent installation, the separate ropes of the tail 42 may be spliced together or otherwise joined.

The device 26 is intended to control both the tail 42 and the barrel or body 44 of the Prusik knot 40 to ensure that the Prusik knot 40 cinches and stops in a controlled, desired fashion when the device 26 takes an impact. The device 26 typically also ensures that the Prusik knot 40 can be slid along the zip line 12 at all other times for positioning purposes. In typical use, the device 26 takes an impact from a single side and must stop the device that impacts, which is usually either a trolley 16 or a primary brake 22 driven by the impact of the trolley 16. The preferred direction of impact is shown by arrow I in FIGS. 1-3. The front and rear of the device 26, for purposes of this description, are defined relative to the preferred direction of impact; therefore, the endwall 30 represents the front of the device 26 in the illustrated embodiment, and the endwall 32 represents the rear of the device 26. Additionally, the term "forwardly" refers to a direction from the rear toward the front of the device 26, and the term "rearwardly" refers to a direction from the front toward the rear of the device 26.

As is shown in FIGS. 2 and 3, in order to fix and maintain tension on the tail 42 of the Prusik knot 40, a tail fixation assembly 46 is pivotably mounted on a fixed, horizontal pin 48 that extends between the two sidewalls 28 of the device 26. In the illustrated embodiment, the tail fixation assembly 46 comprises a pair of wedge- or sector-shaped side plates 50 that are pivotably mounted on the pin 48 near their apexes. The two plates 50 are joined by a bottom plate 52 and by two cross-bars 54 that extend between them closer to the pin 48. (In some cases, the two side plates 50 and the bottom plate 52 may be a bent, contiguous piece of sheet metal or a single piece of machined metal, for example. They are defined separately here only for ease of explanation.)

A movable jaw plate 56 is mounted between the two side plates 50, and is arranged to be driven up and down between the two side plates 50 by a jack screw 58. The tail 42 is clamped between the jaw plate 56 and the cross-bars 54, and exits the device 26 through its open rear, below the rear endplate 32. The position of the tail fixation assembly 46 is set for optimal clamping by inserting a pin into one of a number of pairs of holes 62 that are formed in the sidewalls 28. The pairs of holes 62 are arranged in an arcuate curve relative to one another in the bottom rear of the sidewalls 28, to define a number of rotational positions that can be assumed by the tail fixation assembly 46. The rotational position of the tail fixation assembly 46 can be set by inserting a pin through one of the pairs of holes 62. Thus, the tail 42 is clamped in one of a number of selectable positions, which allows tension to be applied to the tail 42 when an impact occurs. In other embodiments, the tail fixation assembly 46 may have only a single fixed position.

The device 26 also includes a knot-body control assembly 70. The assembly 70 comprises a pair of arcuate, rearwardly-extending contact arms 72. The arms 72 are spaced from one another such that, with the zip line 12 installed, one arm 72 is on either side of the zip line 12. The arms 72 pivot forwardly and rearwardly about a rotational axis 74 defined in the lower front of the device 26. The attachment of the arms 72 and their rotational axis 74 are shown in phantom in the view of FIG. 3.

A short pin or bar 76 extends between the two arms 72 so that they move together. A rotating hook member 78 is pivotally mounted on the bar 76 close to one end of the hook member 78. The hook member 78 is relatively long and extends below the sidewalls 28 of the device 26, terminating in a hook 80. As shown in FIGS. 2 and 3, the hook 80 captures the tail 42 of the Prusik knot 40 below its exit from the device 26. Altogether, the hook member 78 and the two arms 72 form a mechanical linkage.

In essence, the two arms 72 of the knot-body control assembly 70 provide mechanical control over the rapidity with which the device 26 decelerates and arrests the impacting object. While the inventor does not wish to be bound by any particular theory of operation, when the device 26 is impacted from the direction of arrow I in FIGS. 2-3, the device 26 travels rearwardly. At the time of impact, the tail 42 of the Prusik knot 40 is firmly clamped in the tail fixation assembly 46 to the rear of the device 26. Thus, when the device 26 moves rearwardly along the zip line 12 in response to the impact, the tail 42 is pulled rearwardly and tensioned relative to the body 44 of the knot 40, allowing the body 44 of the knot 40 to cinch and engage against the zip line 12. At this point, the body 44 of the knot 40 has usually impacted the arms 72 and driven them to rotate forwardly (clockwise, in the view of FIG. 3).

In the device 26 of FIGS. 1-3, the arms 72 are biased rearwardly (i.e., to rotate counterclockwise) by one or more sets of rare earth magnets 82 mounted in one or both of the sidewalls 28, and either complementary rare earth magnets mounted in the arms 72, or by magnetic interaction with the arms 72 themselves if they are ferromagnetic. Pressure exerted on the body 44 of the Prusik knot 40 by the arms 72 may slow the rate of deceleration of the device 26, either by directly affecting the ability of the body 44 of the Prusik knot 40 to cinch against the zip line 12, or by urging the body 44 of the Prusik knot 40 rearward and thus very slightly reducing the amount of tension in the tail 42. Without the arms 72, the device 26 may function, but the deceleration may be so rapid that it is unpleasant for the passenger P. If the arms 72 are biased rearwardly with an appropriate level of force, stopping may require slightly more distance, but the deceleration will be slower and at a more constant rate. Of course, there may be other, more complex, interactions between the device 26 and the Prusik knot 40 caused by the impulse force of the impact, or by other factors, but in general, it has been found that the greater the rearward (counterclockwise) bias imparted to the arms 72, the slower the deceleration and arrest will be. Whatever its precise mechanism of action, the device 26 and its knot-body control assembly 70 control the rate and manner in which the Prusik knot 40 engages the zip line 12.

Additionally, the hook member 78 that holds the tail 42 serves an additional purpose: it allows the device 26 to be moved along the zip line 12 by an operator without engaging the Prusik knot 40. More specifically, when the device 26 is pulled by the tail 42, the hook member 78 is also pulled because of its engagement with the tail 42. Because the hook member 78 is connected to the arms 72, this causes the arms 72 to move. For example, if the tail 42 is pulled rearwardly, the connection of the hook member 78 with the arms 72 rotates the arms rearwardly, which makes the arms 72 bear against the body 44 of the Prusik knot 40 and forces the body 44 slightly rearwardly, toward the tail 42, thereby reducing tension in the tail 42 and at least partially controlling the manner in which the Prusik knot 40 engages.

Overall, the device 26 allows a trusted and well-understood mechanism, the Prusik knot, to be used as a primary or backup breaking system. One advantage of the device 26 is that the Prusik knot 40 is not cinched against the zip line 12 except upon impact, so the device 26 may be slid freely along the zip line 12 to place it in any desired position. Another advantage of the device 26 is that, by clamping the tail 42 and contacting the body 44 of the Prusik knot 40, the device 26 controls the way in which the Prusik knot 40 cinches against the zip line 12, thereby offering a degree of control over the rate of deceleration, and preventing passengers P from simply stopping short.

Figure 4:
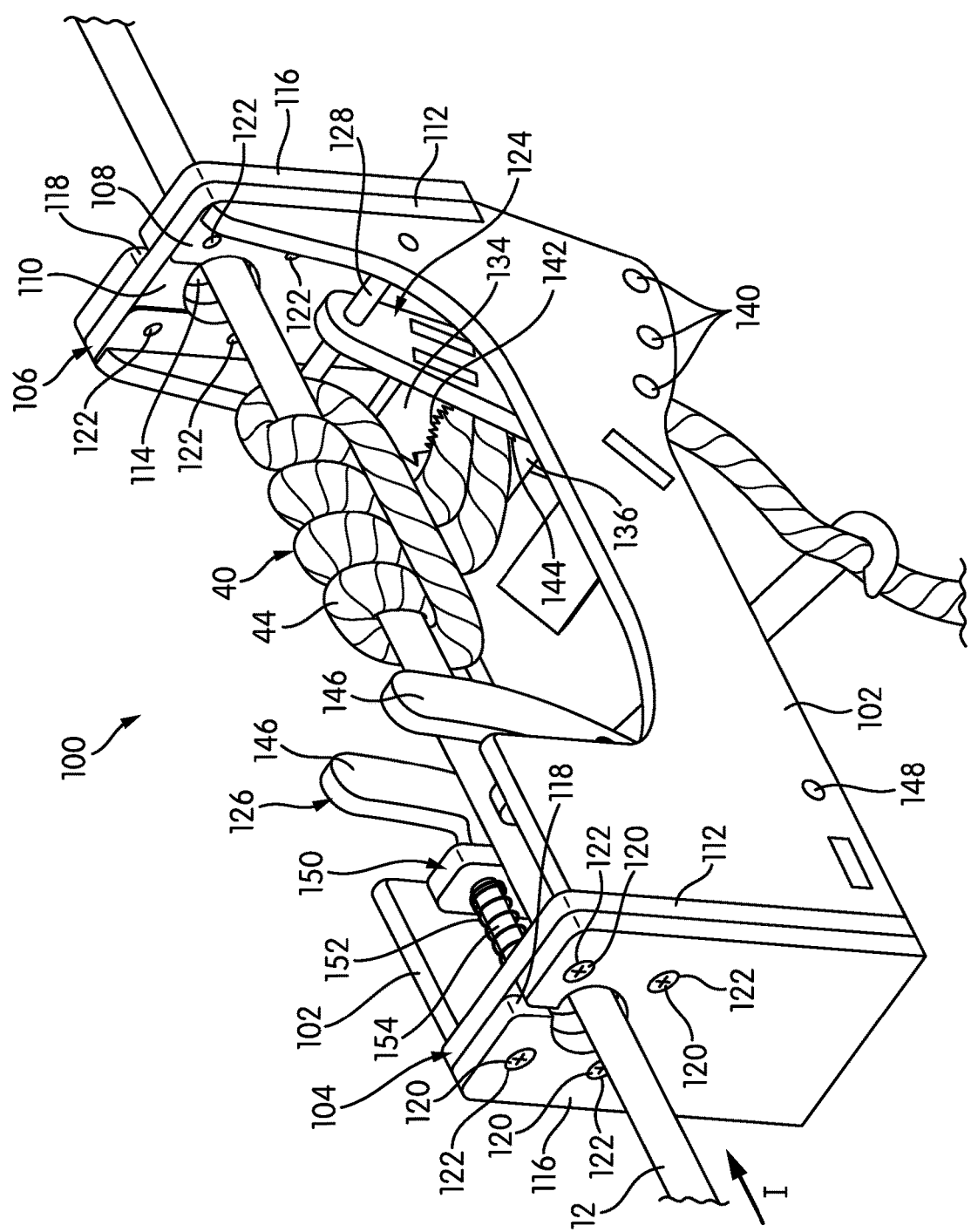
FIG. 4 is a perspective view of an emergency braking device according to another embodiment of the invention.

FIG. 4 is a perspective view of an emergency or backup braking device, generally indicated at 100, according to another embodiment of the invention. The device 100 functions similarly to the device 26 described above. However, certain improvements and additions have been made. Where a component of the device 100 is not described here, it may be assumed to be the same, or essentially the same, as the device 26 described above.

The device 100 has the same basic configuration as the device 26, with two mirror-image sidewalls 102 joined at their ends to a front endwall 104 and a rear endwall 106 to form a generally rectilinear frame with no top or bottom. As with the device 26, the "front" and "rear" of the device 100, as well as frontward and rearward directions, are defined with respect to the direction of impact, indicated by the arrow I in FIG. 4.

The arrangement of the endwalls 104, 106 and the way in which the device 100 engages the zip line 12 is slightly different than in the device 26. Each endwall 104, 106 is constructed of several pieces. A relatively thin inner endplate 108 has a keyhole-type slot 110 that extends downwardly from a top edge. A complementary, thicker outer endplate 112 has a complementary keyhole-type slot 114 that begins at a lower edge and extends upwardly. A rubber slab 116 with approximately the same height and width as the outer endplate 112 sits over the outer endplate 112 to act as a bumper. The rubber slab 116 has its own keyhole-type slot 118, which extends downwardly from a top edge thereof. The rubber slab 116, outer endplate 112 and inner endplate 108 are fastened together by a set of fasteners 120 that insert into sets of holes 122 formed through all three components 116, 112, 108. The fasteners 120 may be, for example, pan-head machine screws, and the holes 122 may be tapped appropriately. Alternately, the fasteners 120 may be cap-head screws and the holes 122 may be both tapped and countersunk. With this arrangement, the device 100 is held securely and permanently on the zip line 12, without requiring the rubber slab 116 to carry a load in order to keep the device 100 in place. Additionally, as can be seen by comparing FIGS. 2 and 4, the rubber slabs 116 may provide more protection than the bumpers 36, as the rubber slabs 116 cover more area.

Figure 5:
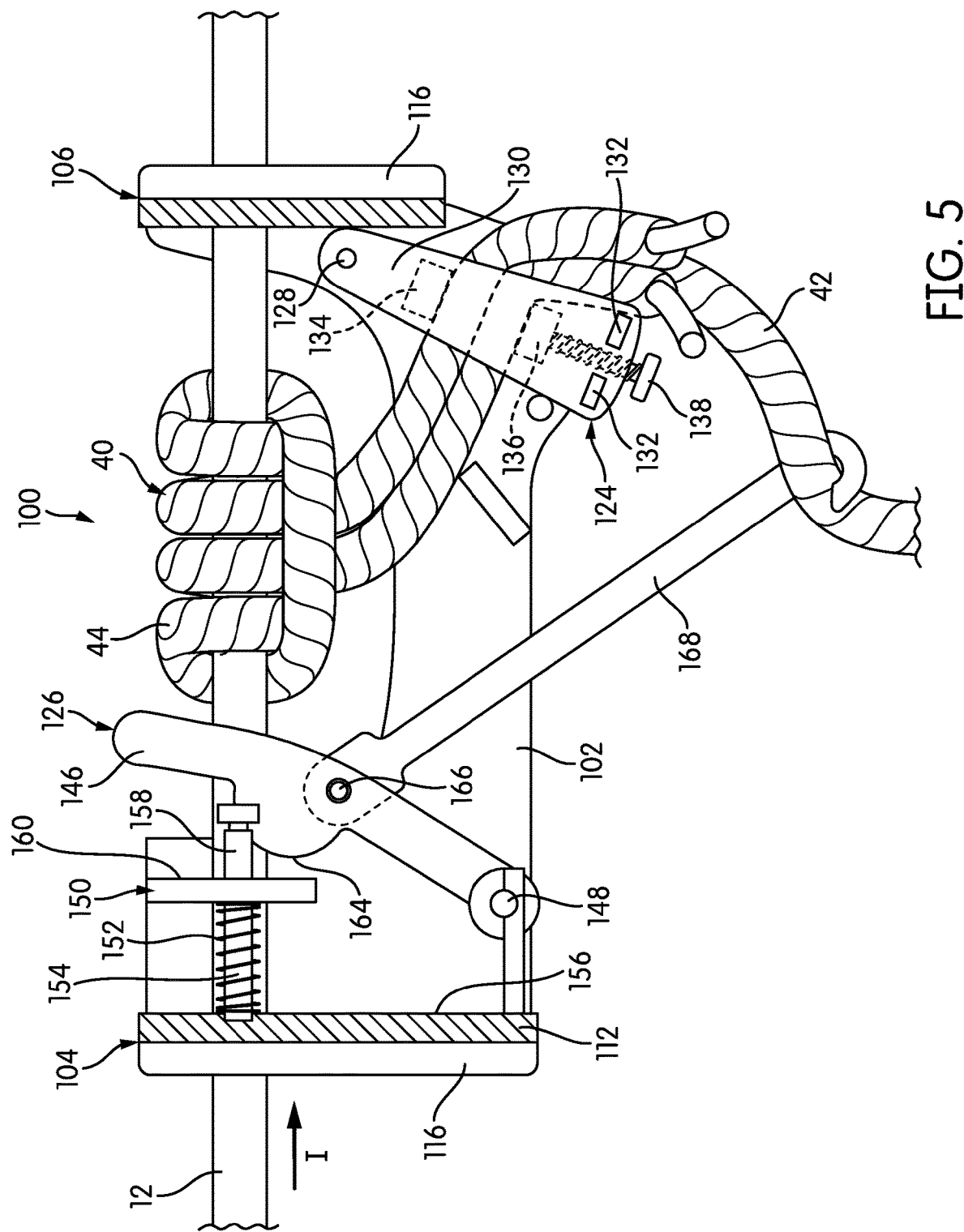
FIG. 5 is a partially sectional side elevational view of the emergency braking device of FIG. 4.
Figure 6:
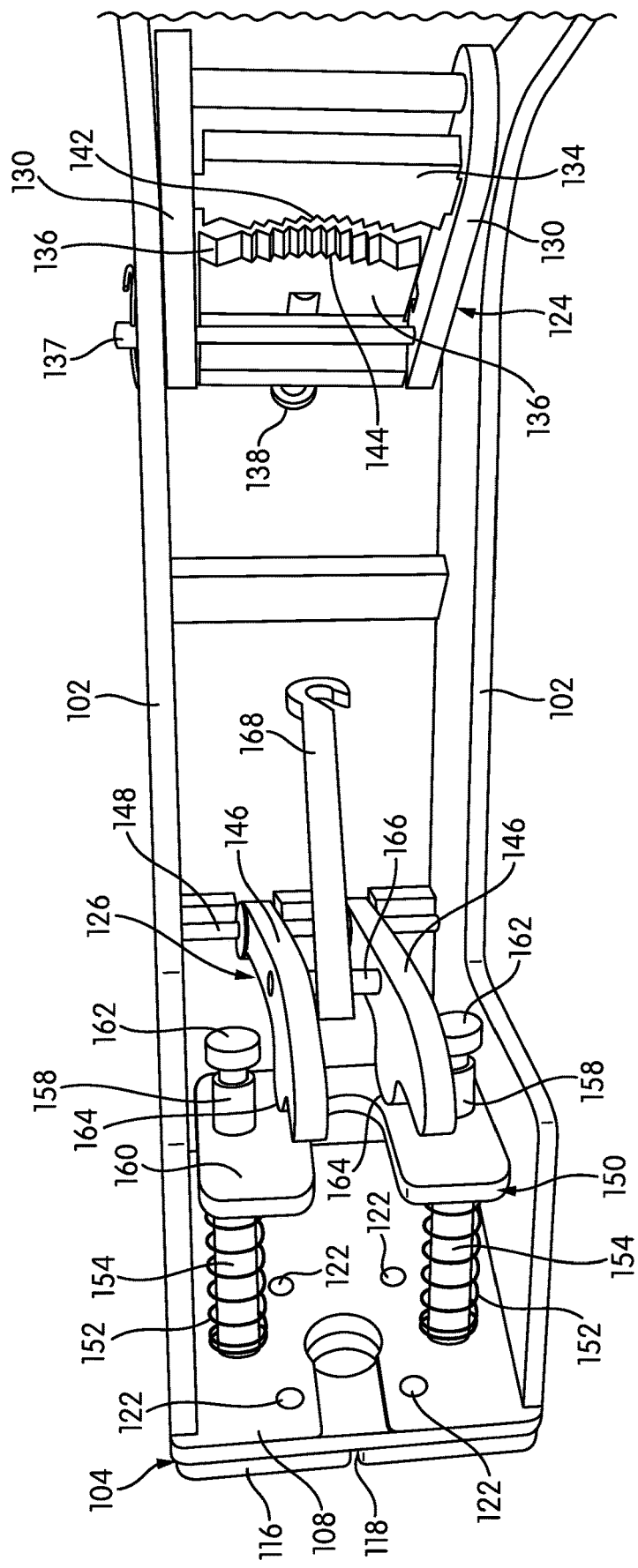
FIG. 6 is a partial top perspective view of the emergency braking device of FIG. 4.

As can be seen in FIG. 4, as well as in the partially sectional side elevational view of FIG. 5 and the partial top perspective view of FIG. 6, the device 100 carries both a tail fixation assembly 124 and a knot-body control assembly 126. Both of these have different features than their counterparts in the device 26 described above.

The tail fixation assembly 124 is pivotably mounted on a fixed, horizontal pin 128 that extends between the two sidewalls 102 of the device 100. In the illustrated embodiment, the tail fixation assembly 124 comprises a pair of wedge- or sector-shaped side plates 130 that are pivotably mounted on the pin 128 near their apexes. The two side plates 130 are joined by a bottom plate 132 that inserts into each of the side plates 130 at two locations. (In some cases, the two side plates 130 and the bottom plate 132 may be a bent, contiguous piece of sheet metal or a single piece of machined metal, for example. They are defined separately here only for ease of explanation.)

A fixed jaw plate 134 is secured between the two side plates 130 close to the apexes of the side plates 130. A movable lower jaw plate 136 is mounted between the two side plates 130, and is arranged to be driven up and down between the two side plates 130 by a jack screw 138. The tail 42 is clamped between the upper and lower jaw plates 134, 136 and exits the device 100 through its open rear, below the rear endplate 106. The position of the tail fixation assembly 124 is set for optimal clamping by inserting a pin into one of a number of pairs of holes 140 that are formed in the sidewalls 102. The pairs of holes 140 are arranged in an arcuate curve relative to one another in the bottom rear of the sidewalls 102, to define a number of rotational positions that can be assumed by the tail fixation assembly 124. The rotational position of the tail fixation assembly 124 can be set by inserting a pin 137 (best seen in FIG. 6) through one of the pairs of holes 140. Thus, the tail 42 is clamped in one of a number of selectable positions, which allows tension to be applied to the tail 42 when an impact occurs. In other embodiments, the tail fixation assembly 46 may have only a single fixed position.

The tail fixation assembly 124 has an additional feature to provide additional gripping force on the tail 42 of the Prusik knot 40: both jaw plates 134, 136 have sets of teeth 142, 144. As can best be seen in the partial top perspective view of FIG. 6, the teeth 142, 144 are set along an arcuate baseline, such that when the jaw plates 134, 136 are completely closed and abutting, there is an oblate opening sized for the tail 42 with a perimeter that is studded with teeth 142, 144. In other embodiments, the teeth 142, 144 could be set across a horizontal baseline. However, having an oblate opening may allow the teeth 142, 144 to better clamp the round rope of the tail 42.

The knot-body control assembly 126 has a pair of arms 146 that extend one to each side of the zip line 12. The arms 146 need not be fully separated; below the level of the zip line 12, they could merge into a unitary base. The arms 146 pivot about a fixed pin 148 installed between the sidewalls 102 near the front endwall 104. The arms 146 are biased to rotate clockwise (in the view of FIG. 5) toward the rear of the device 100. However, the method of biasing the arms 146 in the device 100 is different from that in the device 26.

A plate 150 is mounted for movement within the device 100 at the front end. As can be seen in the perspective view of FIG. 4, the plate 150 has a U-shaped split toward its top, in order to accommodate the zip line 12. A set of compression coil springs 152 are mounted concentrically on cap-head bolts 154 with long shanks that are unthreaded for much of their lengths. (Alternatively, long, straight pins could be used.) As mounted, the springs 152 bear between the inner face 156 of the front inner endplate 112 and the rear of the plate 150. The plate 150 has holes formed in it, such that the bolts 154 pass through the plate 150. Spacers 158 set between the rearward-facing surface of the plate 160 and the heads 162 of the bolts 154 set the initial level of compression of the springs 152, and therefore, the level of force that the springs 152 exert. The springs 152 themselves may be, e.g., 302 stainless steel compression springs that are 1.75 inches (4.45 cm) long and have a 0.455 inch (1.16 cm) outer diameter and a 0.379 inch (0.96 cm) inner diameter. The plate 150 itself is suspended on the bolts 154.

The springs 152 resiliently bias the plate 150 toward the rear of the device 100. The arms 144 rest just rearward of the plate 150 and have front-facing curved contact surfaces 164 that extend forward to contact the plate 150. The plate 150 itself does not have the same height as the sidewalls 102 and terminates just below the contact surfaces 164.

With this arrangement, when the body 44 of the Prusik knot 40 contacts the arms 144, the arms 144 are resiliently biased by the spring-driven plate 150 to exert rearward pressure on the body 44 of the Prusik knot 40. As was explained above, this tends to control the rate and manner in which the Prusik knot 40 cinches on the zip line 12, slowing the impacting element more gradually that would be the case without spring bias. Of course, the compression coil springs 152 shown in FIGS. 4-6 are not the only kind of resilient biasing member that may be used. For example, a torsion spring installed along the pin 148 that serves as a rotational axis for the arms 146 may be used instead of a pair of compression coil springs 152. Moreover, if compression coil springs are used, there may be one or several. In other words, a single compression coil spring could be used, or more than two could be used.

As with the device 26, the device 100 includes a rotating hook member 164 that is pivotally mounted on a bar 166 that extends between the two arms 146. The distal end of the rotating hook member 168 captures the tail 42 of the Prusik knot 40. The way in which the tail 42 is captured and connected with the knot-body control assembly 126 is not critical, and other mechanisms for making the connection may be used in other embodiments. For example, the member 168 need not be rigid in all embodiments.

The device 100 operates in essentially the same way as the device 26; however, the device 100 may provide for better fixation of the tail 42 of the Prusik knot 40, as well as more, and more controlled, application of bias force to the body of the Prusik knot 40 during an impact, in order to control the rate and manner in which the Prusik knot 40 engages.

While the invention has been described with respect to certain embodiments, the description is intended to be exemplary, rather than limiting. Modifications and changes may be made within the scope of the invention, which is defined by the appended claims.

What is claimed is:

1. An emergency arrest device for a zip line, comprising:
a pair of mirror-image sidewalls;
a front endwall connected between the pair of sidewalls at a front end of the device;
a rear endwall connected between the pair of sidewalls at a rear end of the device spaced from the front end of the device and opposite the front endwall, the front and rear endwalls having openings sized and adapted to permit passage of a zip line therethrough;
a tail fixation assembly pivotably mounted between the pair of sidewalls at a first mounting point closer to the rear endwall than to the front endwall, the tail fixation assembly including a clamp; and
a knot-body control assembly mounted between the sidewalls closer to the front endwall than to the rear endwall, the knot-body control assembly including
a pair of arms pivotably mounted between the pair of sidewalls at a second mounting point, spaced from the first mounting point, for forward-rearward rotation, and
a biasing mechanism biasing the pair of arms to rotate rearwardly.

2. The emergency arrest device of claim 1, further comprising a hook member having a first end pivotably mounted to or between the pair of arms at a third mounting point vertically spaced from the second mounting point, and a second end having attaching structure.

3. The emergency arrest device of claim 2, wherein the attaching structure comprises a hook.

4. The emergency arrest device of claim 1, further comprising resilient bumpers installed over outwardly-facing surfaces of the front endwall and the rear endwall, respectively.

5. The emergency arrest device of claim 1, wherein the biasing mechanism comprises a first set of magnets installed in a fixed position on or in one or both of the pair of sidewalls, and a second set of magnets installed on or in the pair of arms.

6. The emergency arrest device of claim 1, wherein the biasing mechanism comprises:
a plate mounted between the pair of sidewalls to move between forward and rearward positions within the device, the plate arranged in a driving relationship with the pair of arms such that movement toward the rearward positions drives the pair of arms into rearward rotation;
at least one resilient member bearing against the plate to drive the plate toward the rearward positions.

7. The emergency arrest device of claim 6, wherein the at least one resilient member bears between an inner face of the front endwall and a rear surface of the plate.

8. The emergency arrest device of claim 7, wherein the at least one resilient member comprises at least one compression coil spring.

9. The emergency arrest device of claim 8, wherein the at least one compression spring comprises at least two compression coil springs spaced from one another.

10. The emergency arrest device of claim 1, wherein the clamp of the tail fixation assembly comprises a fixed jaw plate, a movable jaw plate that is movable relative to the fixed jaw plate, and a jack screw that engages the movable jaw plate to move it relative to the fixed jaw plate.

11. The emergency arrest device of claim 10, wherein the fixed jaw plate and the movable jaw plate are mounted between a pair of side plates, the pair of side plates being pivotally mounted between the pair of sidewalls.

12. The emergency arrest device of claim 10, wherein the fixed jaw plate and the movable jaw plate have teeth that face one another.

13. The emergency arrest device of claim 12, wherein the teeth of the fixed jaw plate and the teeth of the movable jaw plate are set along arcuate baselines.

14. The emergency arrest device of claim 10, further comprising fixation structure adapted to retain the tail fixation assembly in one of several possible defined rotational positions.

15. In combination:
a zip line;
a Prusik knot tied around the zip line; and
an emergency arrest device installed on the zip line around the Prusik knot, the emergency arrest device comprising
a pair of mirror-image sidewalls,
a front endwall connected between the pair of sidewalls at a front end of the device,
a rear endwall connected between the pair of sidewalls at a rear end of the device spaced from the front end of the device and opposite the front endwall, the front and rear endwalls having openings sized and adapted to permit passage of the zip line therethrough,
a tail fixation assembly pivotably mounted between the pair of sidewalls at a first mounting point closer to the rear endwall than to the front endwall, the tail fixation assembly including a clamp adapted to clamp a tail of the Prusik knot, and
a knot-body control assembly mounted between the sidewalls closer to the front endwall than to the rear endwall, the knot-body control assembly adapted to control a body of the Prusik knot, and including
a pair of arms pivotably mounted between the pair of sidewalls at a second mounting point, spaced from the first mounting point, for forward-rearward rotation, and
a biasing mechanism biasing the pair of arms to rotate rearwardly.

16. The combination of claim 15, further comprising a primary brake installed forwardly of the emergency arrest device.

* * * * *